(12) United States Patent
Mang et al.

(10) Patent No.: US 8,817,604 B2
(45) Date of Patent: Aug. 26, 2014

(54) SYSTEMS, METHODS AND COMPUTER READABLE MEDIA FOR UTILIZING SPARE CAPACITY OF LINKS WITHIN A NETWORK

(75) Inventors: Xiaowen Mang, Morganville, NJ (US); Carolyn Roche Johnson, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 716 days.

(21) Appl. No.: 12/620,880

(22) Filed: Nov. 18, 2009

(65) Prior Publication Data

US 2011/0116367 A1    May 19, 2011

(51) Int. Cl.
*H04L 12/24* (2006.01)

(52) U.S. Cl.
CPC .................................. *H04L 41/0654* (2013.01)
USPC ......................................................... 370/228

(58) Field of Classification Search
USPC ................................................. 370/216–228
See application file for complete search history.

(56) References Cited

U.S. PATENT DOCUMENTS

| | | | | |
|---|---|---|---|---|
| 5,495,472 | A * | 2/1996 | Ohara ........................... | 370/224 |
| 5,996,021 | A * | 11/1999 | Civanlar et al. ............... | 709/238 |
| 6,163,525 | A * | 12/2000 | Bentall et al. ................. | 370/227 |
| 6,744,727 | B2 * | 6/2004 | Liu et al. ....................... | 370/228 |
| 7,961,602 | B2 * | 6/2011 | Tochio ........................... | 370/227 |
| 2002/0093971 | A1 * | 7/2002 | Yasuo et al. ................... | 370/403 |
| 2003/0123482 | A1 * | 7/2003 | Kim et al. ....................... | 370/468 |
| 2004/0042402 | A1 * | 3/2004 | Galand et al. ................. | 370/237 |
| 2008/0225838 | A1 * | 9/2008 | Vesma et al. .................. | 370/375 |
| 2011/0269500 | A1 * | 11/2011 | Johansson et al. ............ | 455/525 |

OTHER PUBLICATIONS

Ricciato, Fabio et al., Performance Evaluation of a Distributed Scheme for Protection against Single and Double Faults for MPLS, 2nd Int'l Workshop on Quality of Service in Multiservice IP Networks (QoS-IP 2003), Milano, Feb. 2003, Lecture Notes in Computer Science, vol. 2601 Springer (2003), p. 218-232.*

* cited by examiner

*Primary Examiner* — Benjamin Lamont
(74) *Attorney, Agent, or Firm* — Hartman & Citrin LLC

(57) ABSTRACT

Systems, methods and computer-readable media for utilizing spare link capacities of links within a communications network are described. According to one aspect, a method for utilizing spare network capacity on a communications network includes determining a spare capacity of a plurality of links within the communications network. Upon determining the spare capacity of the plurality of links, a portion of the plurality of links according to the spare capacity of the plurality of links is selected. A standby network including the selected portion of the plurality of links is established, and traffic is routed through the standby network.

12 Claims, 5 Drawing Sheets

SYSTEMS, METHODS AND COMPUTER READABLE MEDIA FOR UTILIZING SPARE CAPACITY OF LINKS WITHIN A NETWORK

TECHNICAL FIELD

Exemplary embodiments are related to utilizing spare network capacity. More particularly, exemplary embodiments relate to utilizing spare capacities of links within a network.

BACKGROUND

In existing Internet Protocol (IP) backbone networks, service providers normally engineer their IP backbone networks with sufficient bandwidth to handle network failures. Links within the IP backbone network are provisioned with spare capacity, such that in the event of a network failure, affected traffic may be rerouted from their normal routes to links having spare capacity. In practice, service providers will allocate some spare capacity in their backbone to ensure reliable transport services when the network experiences a failure. However, under normal conditions, the capacity built in to accommodate traffic resulting from a failure is not used. Because severe failures occur infrequently in well engineered networks, the spare capacity engineered for failure recovery is idle most of the time.

In existing IP networks, different classes of services may be offered by service providers, where each class of service is assigned a Quality of Service (QoS) marking. Traffic is differentiated based on its associated QoS marking as the traffic traverses the IP network. Currently, the lowest existing QoS marking is a "best effort" service, which does not guarantee performance (e.g. delay or loss) for the demand. However, when the IP network is being designed based on traffic forecasts, the IP network takes into account all existing traffic or service types, including the "best effort" service. Therefore, the spare capacity that is engineered for failure situations is idle most of the time, and could be utilized rather than being an unused resource.

SUMMARY

Embodiments of the disclosure presented herein include methods, systems, and computer-readable media for utilizing spare link capacity within a communications network. According to one aspect, a method for utilizing spare network capacity on a communications network includes determining a spare capacity of a plurality of links within the communications network. Upon determining the spare capacity of the plurality of links, a portion of the plurality of links according to the spare capacity of the plurality of links is selected. A standby network including the selected portion of the plurality of links is established and traffic is routed through the standby network.

According to another aspect, a system for utilizing spare network capacity on a communications network includes a memory for storing a program containing code for utilizing spare network capacity and a processor functionally coupled to the memory. The processor is responsive to computer-executable instructions contained in the program and configured to determine a spare capacity of a plurality of links within the communications network. Upon determining the spare capacity of the plurality of links, a portion of the plurality of links according to the spare capacity of the plurality of links is selected. A standby network including the selected portion of the plurality of links is established and traffic is routed through the standby network.

According to yet another aspect, a computer-readable medium for utilizing spare network capacity on a communications network, having computer-executable instructions stored thereon for execution by a computer, causes the computer to determine a spare capacity of a plurality of links within the communications network. Upon determining the spare capacity of the plurality of links, a portion of the plurality of links according to the spare capacity of the plurality of links is selected. A standby network including the selected portion of the plurality of links is established and traffic is routed through the standby network.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
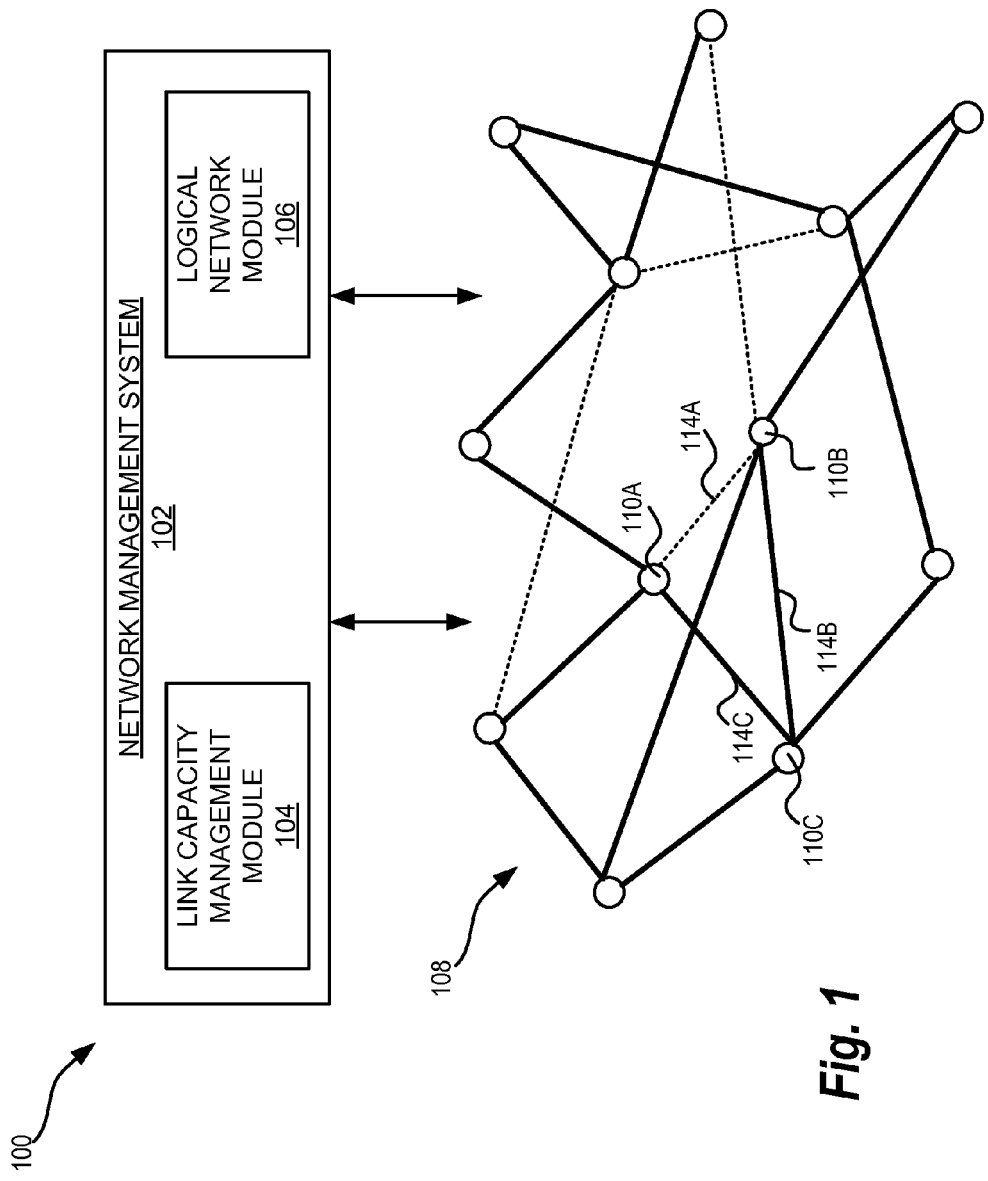
FIG. 1 illustrates a network architecture including a network management system in communication with a communications network, according to various embodiments.

The following detailed description is directed to methods, systems, and computer-readable media for utilizing the spare network capacity within an IP backbone network. Through the implementation of the present disclosure, the spare network capacity allocated to an underlying IP backbone network to ensure reliable transport services during a network failure may be utilized even when a network failure does not occur. By doing so, previously unused spare network capacity that typically remains idle most of the time, may be utilized for services without adversely affecting the quality of service currently being provided. In this way, service providers may maximize the utilization of the IP backbone network through additional services.

In typical IP backbone networks, various network elements that are a part of the backbone network form links that, along with the various network elements, make up a first or standard logical network. This logical network may be represented by all the links between network elements within the IP backbone network. According to embodiments of the present disclosure, a secondary or standby logical network is determined and established to utilize the spare network capacity within the IP backbone network. In this way, two logical networks are now operating on the same IP backbone network, and traffic marked for the secondary logical network is routed through the secondary logical network, while traffic marked for the standard logical network is routed through the standard logical network. Accordingly, previously unused spare capacities of links in the standard logical network may be utilized, thereby increasing the overall utilization of the IP backbone network. Through various implementations of the present disclosure, the IP backbone network now includes the previously existing standard logical network for which the IP backbone network was originally engineered, and the standby logical network that utilizes the spare network capacity originally provisioned for a network failure situation that may occur in the standard logical network.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, like numerals will represent like elements through the several figures.

FIG. 1 illustrates a network architecture 100 including a network management system 102 in communication with a network 108, such as an IP backbone network. The network management system 102 includes algorithms, modules and programs for performing the various operations described herein. According to embodiments, the network management system 102 includes a link capacity management module 104 and a logical network module 106. The network management system 102 is configured to communicate with various network elements within the network 108, monitor the traffic routed through the network 108 and manage both a standard logical network and a standby logical network associated with the network 108, as discussed further below.

Like typical IP backbone networks, the network 108 may include network elements 110A-110C, such as routers and the like. The network elements 110A-110C may form links with other network elements, and the collection of links forms a logical network. However, as described above, the network 108 of the present disclosure includes a standard logical network for which the IP backbone network was originally engineered, and a standby logical network that utilizes the spare network capacity originally provisioned for network failures that may occur in the standard logical network. According to embodiments, the network element 110A forms a link 114A with the network element 110B and a link 114C with the network element 110C. Similarly, the network element 110B forms a link 114B with the network element 110C. As illustrated in FIG. 1, the link 114A is shown as a dotted line, while the link 114B and the link 114C are shown as solid, bold lines. As used herein, all the lines represent links that are a part of the standard logical network. The dotted lines shown in FIG. 1 represent links that are only part of the standard logical network, and the solid, bold lines indicate links that are a part of both the standard logical network and the standby logical network. The links, such as the links 114B and 114C, associated with the solid, bold lines make up the standby logical network. It should be appreciated that the standby logical network may include all the links that form the standard logical network, but depending on the amount of spare capacity on each of those links, some links may not be utilized to route standby traffic.

The link capacity management module 104 may reside within the network management system 102 or may be associated with a standalone server. According to exemplary embodiments, the link capacity management module 104 periodically receives link utilization data from each of the links of the standard logical network. The link utilization data of a link, such as the link 114A, may include the utilization of the link by the network 108 at any given point in time. The link capacity management module 104 may further be configured to determine the spare capacity of links according to predefined maximum capacity values set by a network administrator. Once the spare capacity of links is determined, the link capacity management module 104 may be configured to report the spare capacity of each link to the logical network module 106, which as described above, may also be a part of the network management system 102.

According to embodiments, the network 108 is configured to route traffic through the network using standard routing protocols, such as the open shortest path first (OSPF) protocol. Since the network 108 is engineered to have spare network capacity, embodiments of the present disclosure utilize the spare network capacity to establish the secondary or standby logical network which includes those links from the standard logical network, such as the links 114B and 114C, that have spare link capacities. The standby logical network may be established using an overlay approach to the IP backbone network. Through the implementation of the present disclosure, the network 108 includes the standard logical network for which the network 108 was originally engineered and the standby logical network that utilizes the spare network capacity provisioned for a network failure situation.

Since two logical networks are now operating on the same network 108, separate routing tables may be utilized to route the traffic associated with the standby logical network and the standard logical network. In addition, according to exemplary embodiments of the present disclosure, data packets of the traffic are marked at an ingress network element indicating whether the data packet is intended for the standard logical network or the standby logical network. According to exemplary embodiments, the two separate routing tables are distributed to and stored on each of the network elements 110A-110C that are a part of the standby logical network. A standard routing table may be stored on each of the network elements for routing data packets marked for the standard logical network. Similarly, in various embodiments, a standby routing table may be assigned to each of the network elements that are a part of the standby logical network for routing data packets marked with the standby logical network. The standby routing table and the standard routing table may additionally or alternatively be stored anywhere within the network 108, such that it is accessible by network elements associated with the standby logical network and the standard logical network, respectively.

As described above, according to exemplary embodiments, all the links within the standard logical network may be a part of the standby logical network, even if one or more of the links within the standard logical network does not have any spare link capacity. The standby routing tables may be used to dictate which links of the standby logical network are to be used to route the data packets. According to exemplary embodiments, if a link, such as the link 114C, is determined to have little or no spare link capacity, a high routing cost value may be associated with the link and updated on the standby routing table so that the link 114C is avoided when determinations are made regarding routing a data packet associated with the standby logical network. In this way, using the OSPF protocol or a similar routing protocol, links having a high routing cost value may have lower probability of being utilized for routing traffic. It should be appreciated that links within the standard logical network that currently have little or no spare link capacity may eventually have more spare link capacity, and therefore may be utilized for routing traffic associated with the standby logical network. By including all the links within the standard logical network as part of the standby logical network, links that previously had little or no spare link capacity but currently have spare link capacity may be utilized to route traffic associated with the standby logical network without having to add or remove network elements to or from the standby logical network upon a change in the standard logical network.

Alternatively, in some embodiments, the link capacity management module may only select those links of the standard logical network that have a particular threshold of spare link capacity to form the standby logical network. Over time, the spare link capacity of the links within the standby logical network may decrease. In order to remove links that no longer have the particular threshold of spare link capacity from the standby logical network, the spare link capacities of links within the standard logical network are periodically reviewed. Upon reviewing the standard logical network, links that now meet the particular threshold of spare link capacity form a new standby logical network.

According to exemplary embodiments, the standby logical network may be dynamic, which means that changes to the standard logical network may alter the standby logical network. Changes to the standard logical network that may cause a change to the standby logical network include changes in the spare capacities of links associated with the standard logical network. This may be due to network failures, increased or decreased traffic volumes on particular links, addition or removal of network elements within the standby logical network, and the like. As described above, exemplary embodiments of the present disclosure utilize standby routing tables to route data packets through the standby logical network. As will be described below, the standby routing tables may be updated according to a schedule set by the network management system 102. The standby routing tables may update the routing cost values associated with each link within the standby logical network depending upon the spare link capacities of links within the standard logical network.

Figure 2:
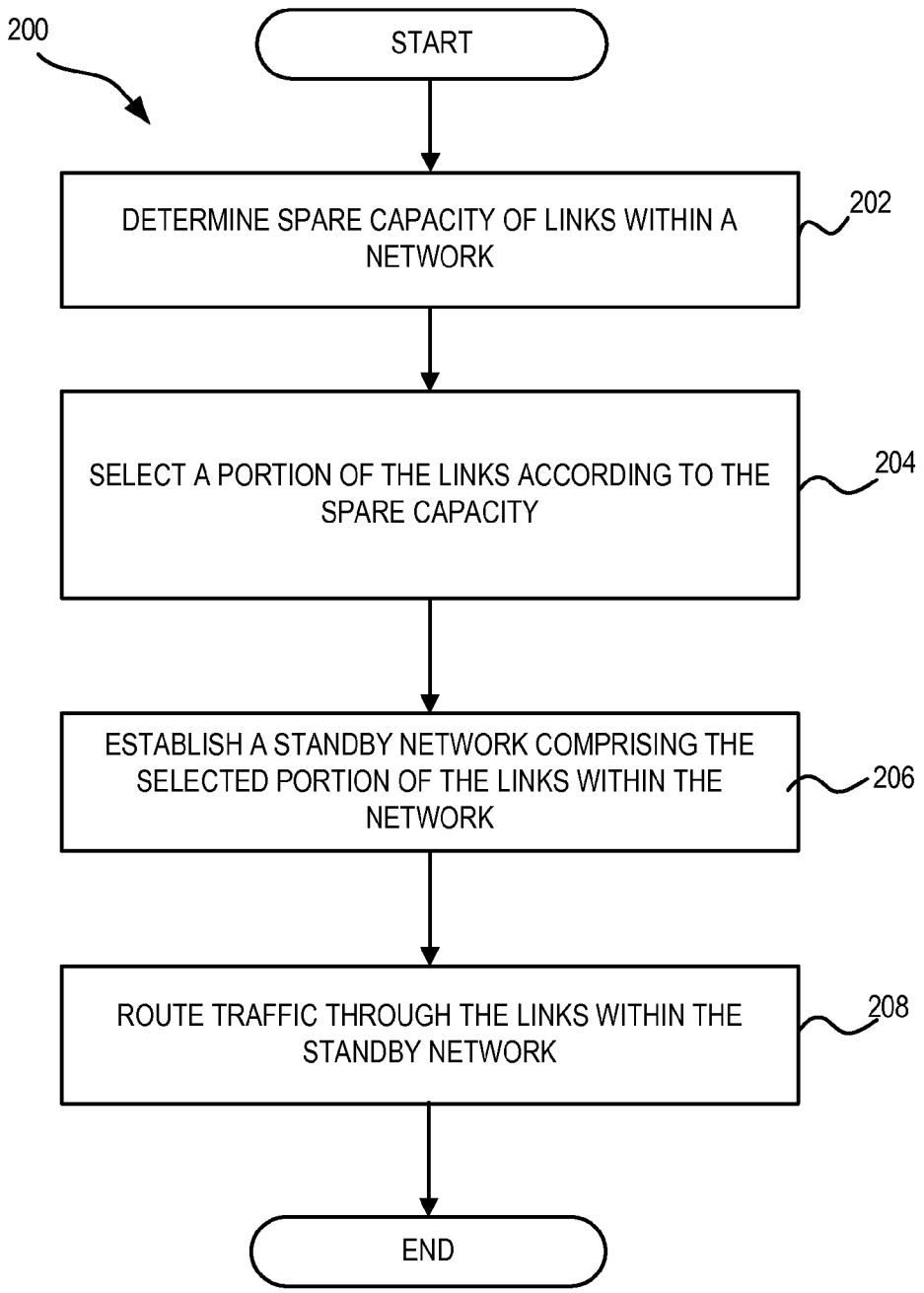
FIG. 2 is a logical flow diagram illustrating aspects of a process for utilizing spare network capacity on the communications network, according to various embodiments.
Figure 3:
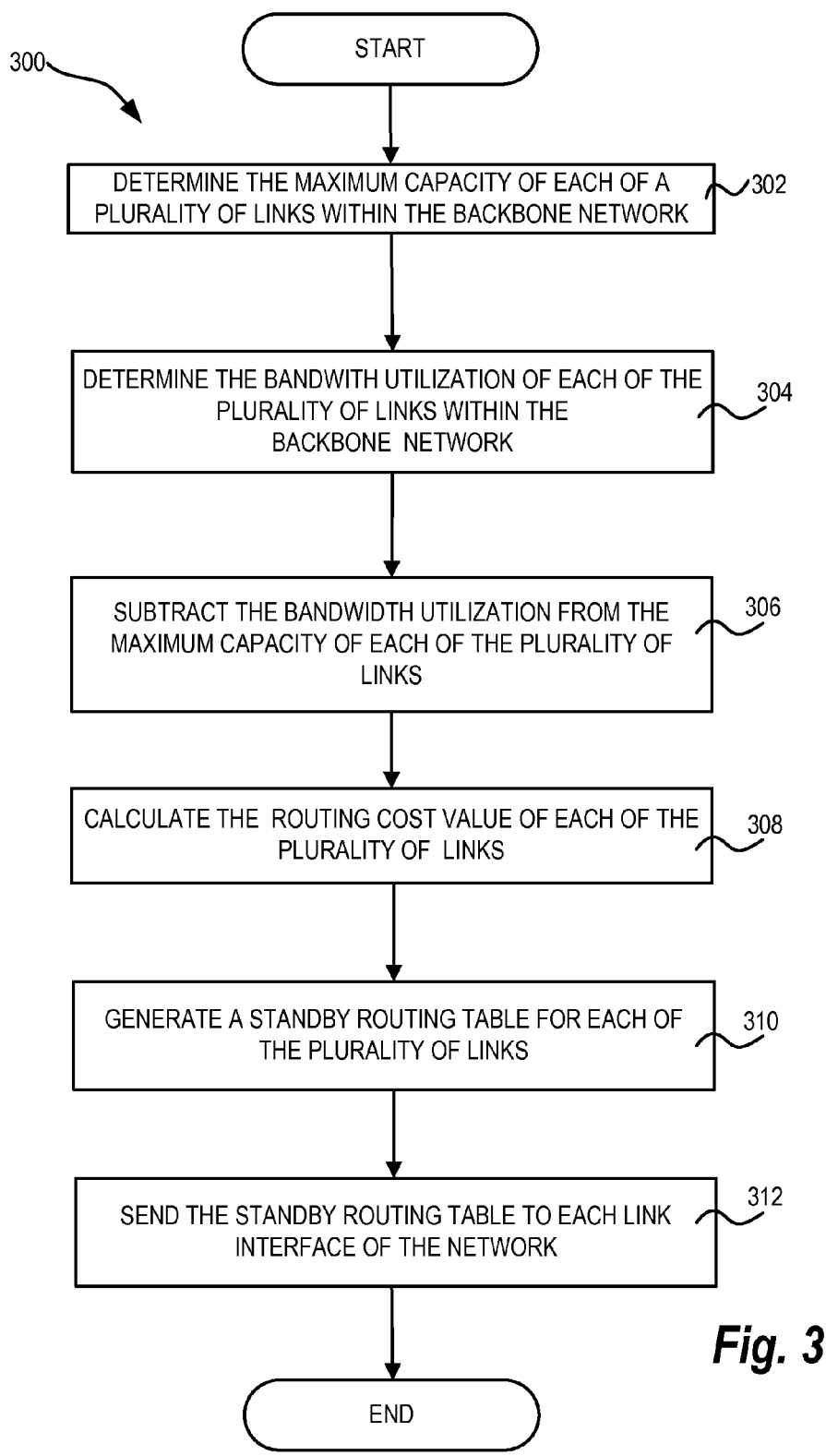
FIG. 3 is a logical flow diagram illustrating aspects of a process for determining the spare network capacity of links within the communications network, according to various embodiments.
Figure 4:
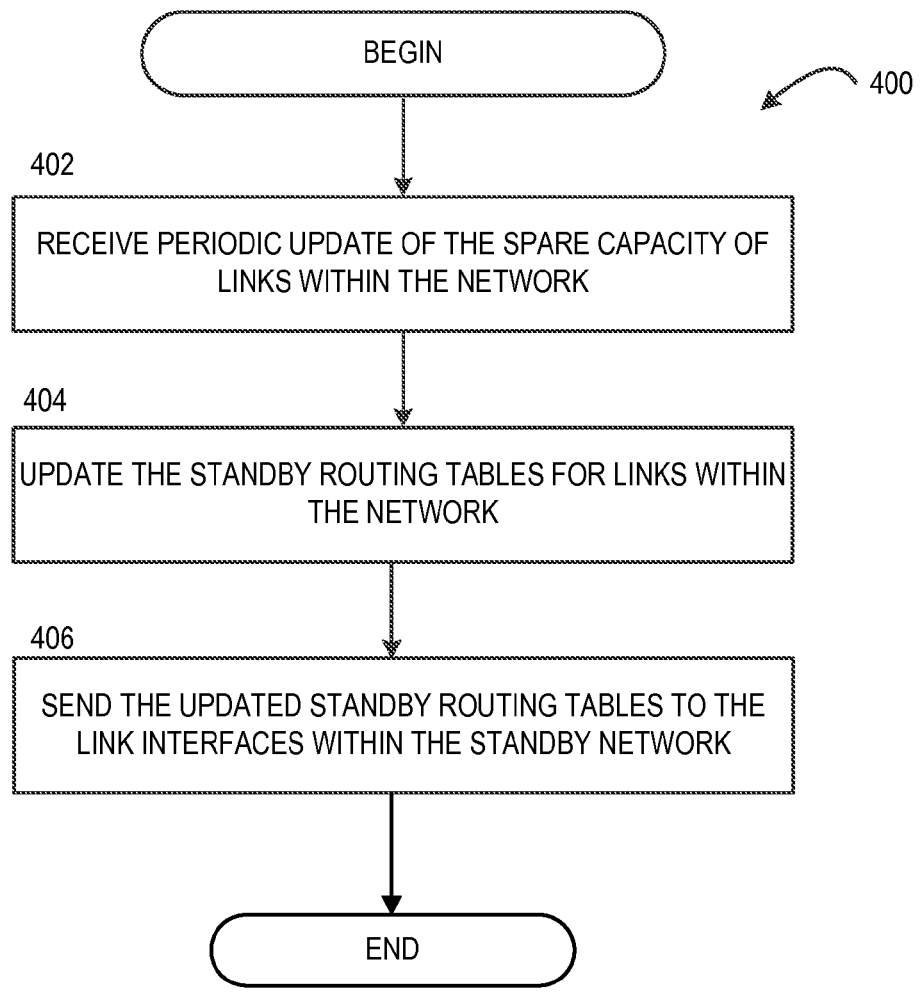
FIG. 4 is a logical flow diagram illustrating aspects of a process for updating an established standby network within the communications network, according to various embodiments.

Turning now to FIGS. 2, 3 and 4, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 2, additional details regarding utilizing spare network capacity on the network 108, will be provided according to embodiments of the present disclosure. In particular, FIG. 2 is a logical flow diagram illustrating aspects of a process for utilizing spare network capacity on the network 108. The routine 200 begins at operation 202, where the link capacity management module 104 may determine the spare link capacity of each of the links within the network. Details regarding how the link capacity management module 104 determines the spare link capacity of each of the links within the network are described below in regard to FIG. 3. From operation 202, the routine 200 proceeds to operation 204, where the link capacity management module 104 selects a portion of the links within the network 108 to be included in the standby logical network. According to exemplary embodiments, the links may be selected using a threshold based method, where only links having a spare link capacity greater than a threshold value are qualified to be a part of the standby logical network. As described above, the link capacity management module 104 may select a portion of the links within the network based on the spare link capacity of each of the links within the IP backbone network. Further, as mentioned above, the standby logical network may include all of the links of the standard logical network. From operation 204, the routine 200 proceeds to operation 206, where the logical network module 106 establishes the standby logical network. The standby logical network includes the portion of links qualified to be a part of the standby logical network based on their respective spare link capacity. The logical network module 106 may then send a standby routing table to each of the standby link interfaces, which may be network elements such as nodes or routers, between which the links associated with the standby logical network exist.

It should be appreciated that the standby link interfaces or in general the routing function within the underlying network, may store a standby routing table to route data packets of the traffic marked for the standby logical network. As described above, the ingress network element, which, as used herein, is the network element through which the data packet enters the network, may be configured to mark the data packet for the standby logical network or the standard logical network.

From operation 206, the routine 200 proceeds to operation 208, where data packets of the traffic marked for the standby logical network, may be routed through the standby logical network according to a standard protocol, such as the OSPF protocol. The network elements 110 within the network 108 may inspect the header of the data packets to determine whether the data packets are intended for the standby logical network or the standard logical network. Further, because there are two logical networks being implemented on the network 108 simultaneously, by marking the data packets and by providing standby routing tables to the link interfaces or routing function within the standby logical network, data packets of the traffic associated with the standby logical network are routed through the links within the standby logical network. It should be appreciated that the routing tables may include routing cost values associated with the links, and may route the data packets through the network by comparing the routing cost values of different traffic routes and routing the data packets using a route having the lowest total routing cost value. From operation 208, the routine 200 ends.

Referring now to FIG. 3, a logical flow diagram illustrating aspects of a routine 300 for determining the spare link capacity of links within the network 108 is shown. The routine 300 begins at operation 302, where the maximum capacity of each of the links within the network 108 is received. As used herein, the maximum capacity of a link is the maximum capacity that the link is engineered to handle. The routine 300 then proceeds from operation 302 to operation 304, where the bandwidth utilization of each of the links within the network 108 is received. As used herein, the bandwidth utilization of a link is an operator configurable parameter, such that a service provider may specify the measured bandwidth according to their own engineering needs. Examples of the bandwidth utilization may be the daily peak hour usage, the hourly average bandwidth usage, the daily average bandwidth usage, the smoothed values of measured traffic volume, and the like. According to exemplary embodiments, techniques such as an exponential smoothing method may be used to determine the smoothed values of measured traffic volume.

From operation 304, the routine 300 proceeds to operation 306, where the spare link capacity of each link is determined by subtracting the bandwidth utilization of a link within the network from the maximum capacity of the particular link. From operation 306, the routine 300 proceeds to operation 308, where the routing cost value of each link is calculated. As described above, the routing cost value of each link may be calculated based on the spare link capacity of a particular link. In exemplary embodiments, the routing cost value of a link is inversely proportional to the spare link capacity of the link. From operation 308, the routine 300 proceeds to operation 310, where a standby routing table for each of the links within the network is generated according to the routing cost values calculated by the link capacity management module of the network management system. From operation 310, the routine 300 proceeds to operation 312, where the generated routing tables are sent to the link interfaces or routing function within the standby logical network. In this way, the data packets marked as standby may be routed through the network 108 according to a routing protocol that utilizes the standby routing tables stored in each of the link interfaces of the standby logical network. From operation 312, the routine 300 ends.

Referring now to FIG. 4, a logical flow diagram illustrating aspects of a routine 400 for updating an established standby logical network within the network 108 is shown. The routine 400 begins at operation 402, where the link capacity management module 104 receives an update to the spare link capacity of the links within the standby logical network. The link capacity management module 104 may poll the link interfaces, such as network elements 110 of the network 108 to determine the spare link capacity of the links 114, or each link interface may automatically provide the link capacity management module 104 with updated spare link capacities of the links associated with the particular link interface. Although each link interface may update the link capacity management module 104 at real-time or near real-time, the update may occur hourly, daily, weekly, or over any period of time. Once the updated spare link capacities are received by the link capacity management module 104, the routine 400 proceeds from operation 402 to operation 404, where the logical network module 106 updates the standby routing tables according to the updated spare link capacities. It should be appreciated that updating the routing tables at each of the link interfaces or the routing function may utilize a lot of system resources and may create additional network traffic.

From operation 404, the routine 400 proceeds to operation 406, where the logical network module 106 sends the updated standby routing tables to the link interfaces within the standby network. It should be appreciated that sending the routing tables may consume a lot of network resources, and therefore, the updated routing tables may be sent to the link interfaces 110 during a period when there is less traffic on the network. In this way, the logical network module 108 may send the updated standby routing tables during off-peak times when there is less traffic on the network. From operation 406, the routine 400 ends.

Figure 5:
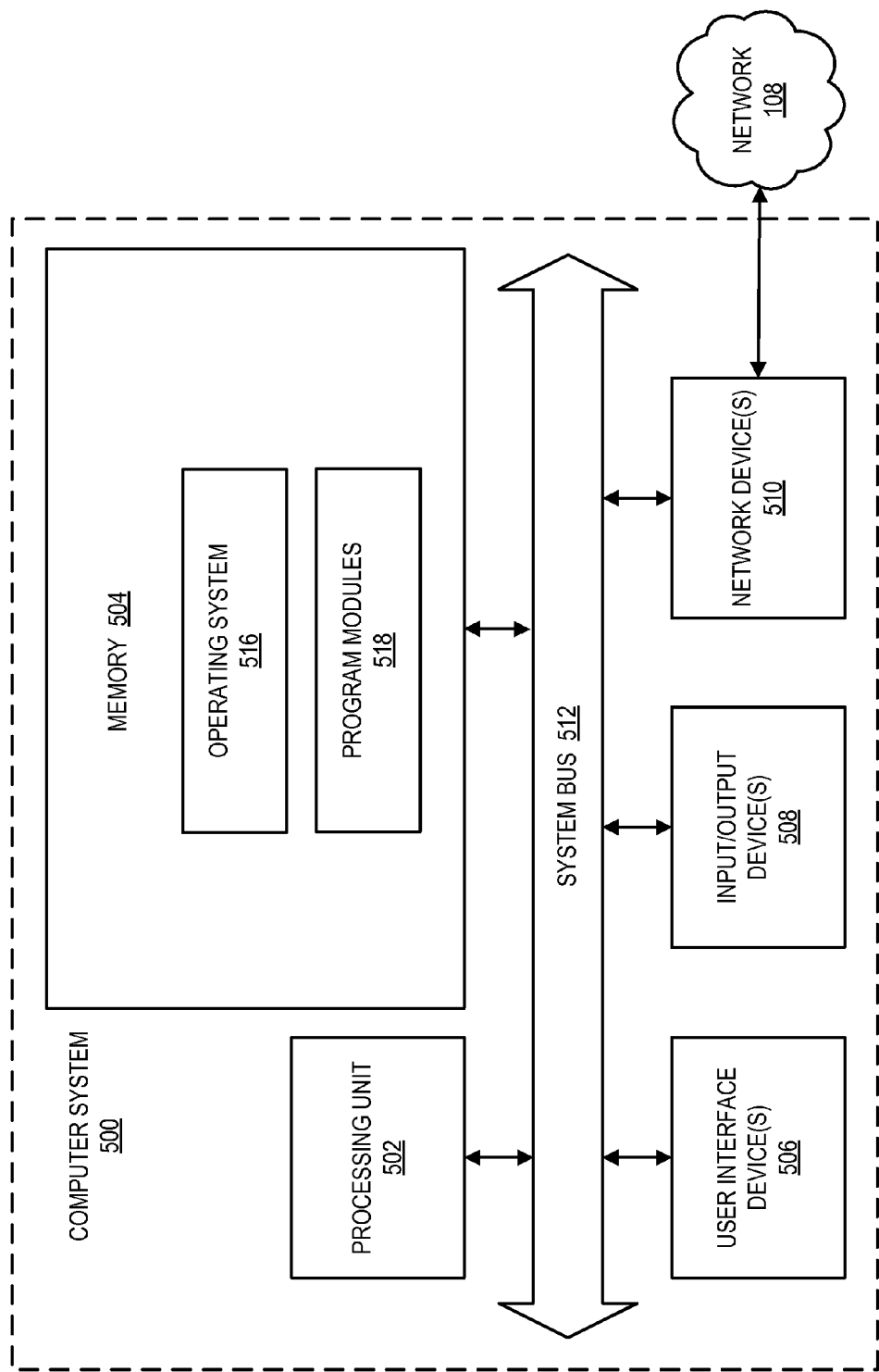
FIG. 5 is a block diagram illustrating an exemplary computer system configured to utilize the spare network capacity within the communications network, in accordance with some embodiments.

FIG. 5 is a block diagram illustrating a computer system 500 configured to establish a standby logical network utilizing the spare network capacity within an IP backbone network, in accordance with embodiments. Examples of the computer system 500 may include the network management system 102. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 504 communicates with the processing unit 502 via the system bus 512. In one embodiment, the memory 504 is operatively connected to a memory controller (not shown) that enables communication with the processing unit 502 via the system bus 512. The memory 504 includes an operating system 516 and one or more program modules 518, according to exemplary embodiments. Examples of operating systems, such as the operating system 516, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 518 include the link capacity management module 104 and the logical network module 106. In some embodiments, the program modules 518 are embodied in computer-readable media containing instructions that, when executed by the processing unit 502, performs embodiments of the routine 200 for utilizing spare network capacity on the network, routine 300 for determining the spare link capacity of links within the IP backbone network and routine 400 for updating an established standby network within the network, as described in greater detail above with respect to FIGS. 2, 3 and 4. According to embodiments, the program modules 518 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500.

The user interface devices 506 may include one or more devices with which a user accesses the computer system 500.

The user interface devices 506 may include, but are not limited to, computers, servers, personal digital assistants, cellular phones, or any suitable computing devices. The I/O devices 508 enable a user to interface with the program modules 518. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 108. Examples of the network devices 510 may include, but are not limited to, a modem, a radio frequency ("RF") or infrared ("IR") transceiver, a telephonic interface, a bridge, a router, or a network card. The network 108 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 108 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for utilizing spare network capacity on a communications network, comprising:
   determining, by a processor, a spare capacity of links between elements within the communications network, wherein at least a portion of the spare capacity of the links comprises a capacity of the links provisioned for use during a time of failure within the communications network and wherein determining the spare capacity of the links between the elements within the communications network comprises subtracting a bandwidth usage value of each of the links from a maximum capacity value for each of the links, wherein the bandwidth usage value of each of the links is a peak usage per a time period;
   upon determining the spare capacity of each of the links, determining, by the processor, a routing cost associated with each of the links, wherein the routing cost associated with each link is for routing over the link utilizing the spare capacity of the link and wherein the routing cost associated with each of the links is inversely proportional to the spare capacity of each of the links;
   generating, by the processor, a standby routing table comprising the routing cost associated with each of the links;
   receiving, by the processor, a data packet for routing through the communications network utilizing the spare capacity of the links; and
   routing, by the processor, during a time of no failure within the communications network, the data packet through the communications network utilizing at least a portion of the spare capacity of at least a portion of the links based on the standby routing table.

2. The method of claim 1, further comprising sending the standby routing table to the elements within the communications network.

3. The method of claim 1, further comprising:
   receiving an update to the spare capacity of a link of the links;
   in response to receiving the update, updating the standby routing table based on the update to the spare capacity of the link; and
   sending the standby routing table including the update to the spare capacity of the link to the elements within the communications network.

4. The method of claim 1, wherein the data packet for routing through the communications network utilizing the spare capacity of the links comprises information in a header of the data packet indicating the data packet is to be routed utilizing the spare capacity of the links.

5. A system for utilizing spare network capacity on a communications network, comprising:
   a processor; and
   memory coupled to the processor, the memory comprising instructions that, when executed by the processor, cause the processor to perform operations comprising:
      determining a spare capacity of links between elements within the communications network, wherein at least a portion of the spare capacity of the links comprises a capacity of the links provisioned for use during a time of failure within the communications network and wherein determining the spare capacity of the links between the elements within the communications network comprises subtracting a bandwidth usage value of each of the links from a maximum capacity value for each of the links, wherein the bandwidth usage value of each of the links is a peak usage per a time period,
      upon determining the spare capacity of each of the links, determining a routing cost associated with each of the links, wherein the routing cost associated with each link is for routing over the link utilizing the spare capacity of the link and wherein the routing cost associated with each of the links is inversely proportional to the spare capacity of each of the links,
      generating a standby routing table comprising the routing cost associated with each of the links,
      receiving a data packet for routing through the communications network utilizing the spare capacity of the links, and
      routing, during a time of no failure within the communications network, the data packet through the communications network utilizing at least a portion of the spare capacity of at least a portion of the links based on the standby routing table.

6. The system of claim 5, wherein the memory comprises further instructions that, when executed by the processor, cause the processor to perform operations comprising sending the standby routing table to the elements within the communications network.

7. The system of claim 5, wherein the memory comprises further instructions that, when executed by the processor, cause the processor to perform operations comprising:
   receiving an update to the spare capacity of a link of the links;
   in response to receiving the update, updating the standby routing table based on the update to the spare capacity of the link; and
   sending the routed table including the update to the spare capacity of the link to the elements within the communications network.

8. The system of claim 5, wherein the data packet for routing through the communications network utilizing the spare capacity of the links comprises information in a header of the data packet indicating the data packet is to be routed utilizing the spare capacity of the links.

9. A computer-readable storage device for utilizing spare network capacity on a communications network, having computer-executable instructions stored thereon that, when executed by a computer, cause the computer to perform operations comprising:
   determining a spare capacity of links between elements within the communications network, wherein at least a portion of the spare capacity of the links comprises a capacity of the links provisioned for use during a time of failure within the communications network and wherein determining the spare capacity of the links between the elements within the communications network comprises subtracting a bandwidth usage value of each of the links from a maximum capacity value for each of the links, wherein the bandwidth usage value of each of the links is a peak usage per a time period;
   upon determining the spare capacity of each of the links, determining a routing cost associated with each of the links, wherein the routing cost associated with each link is for routing over the link utilizing the spare capacity of the link and wherein the routing cost associated with each of the links is inversely proportional to the spare capacity of each of the links;
   generating a standby routing table comprising the routing cost associated with each of the links;
   receiving a data packet for routing through the communications network utilizing the spare capacity of the links; and
   routing, during a time of no failure within the communications network, the data packet through the communications network utilizing at least a portion of the spare capacity of at least a portion of the links based on the standby routing table.

10. The computer-readable storage device of claim 9, having further computer-executable instructions stored thereon that, when executed by the computer, cause the computer to perform operations comprising sending the standby routing table to the elements within the communications network.

11. The computer-readable storage device of claim 9, having further computer-executable instructions stored thereon that, when executed by the computer, cause the computer to perform operations comprising:
   receiving an update to the spare capacity of a link of the links;
   in response to receiving the update, updating the standby routing table based on the update to the spare capacity of the link; and
   sending the standby routing table including the update to the spare capacity of the link to the elements within the communications network.

12. The computer-readable storage device of claim 9, wherein the data packet for routing through the communications network utilizing the spare capacity of the links comprises information in a header of the data packet indicating the data packet is to be routed utilizing the spare capacity of the links.

\* \* \* \* \*